United States Patent
Anderson

(10) Patent No.: US 7,570,264 B2
(45) Date of Patent: *Aug. 4, 2009

(54) RIG BAKING

(75) Inventor: John Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/021,289

(22) Filed: Jan. 28, 2008

(65) Prior Publication Data

US 2008/0204457 A1    Aug. 28, 2008

Related U.S. Application Data

(63) Continuation of application No. 10/844,048, filed on May 11, 2004, now Pat. No. 7,333,112.

(60) Provisional application No. 60/470,590, filed on May 14, 2003, provisional application No. 60/470,767, filed on May 14, 2003.

(51) Int. Cl.
*G06T 13/00* (2006.01)
(52) U.S. Cl. ....................... 345/473
(58) Field of Classification Search ............ 345/473
See application file for complete search history.

(56) References Cited

U.S. PATENT DOCUMENTS

| | | | | |
|---|---|---|---|---|
| 6,011,562 A * | 1/2000 | Gagne et al. | ............ | 345/473 |
| 6,088,042 A * | 7/2000 | Handelman et al. | ......... | 345/473 |
| 6,162,120 A * | 12/2000 | Takahashi et al. | ............ | 463/8 |
| 6,322,448 B1 * | 11/2001 | Kaku et al. | ................. | 463/32 |
| 6,626,759 B1 * | 9/2003 | Matsuoka | ................. | 463/31 |
| 6,997,882 B1 * | 2/2006 | Parker et al. | ............... | 600/534 |
| 2005/0166179 A1 * | 7/2005 | Vronay et al. | ............... | 717/105 |

\* cited by examiner

*Primary Examiner*—Xiao M Wu
*Assistant Examiner*—Said Broome
(74) *Attorney, Agent, or Firm*—Law Office of Jonathan Hollander PC

(57) ABSTRACT

Model components can be used to pose character models to create a variety of realistic and artistic effects. An embodiment of the invention analyzes the behavior of a model component to determine a statistical representation of the model component that closely approximates the output of the model component. As the statistical representation of model components execute faster than the original model components, the model components used to pose a character model can be replaced at animation time by equivalent statistical representations of model components to improve animation performance. The statistical representation of the model component is derived from an analysis of the character model manipulated through a set of representative training poses. The statistical representation of the model component is comprised of a weighted combination of posed frame positions added to a set of posing errors controlled by nonlinear combinations of the animation variables.

25 Claims, 12 Drawing Sheets

622

624

626

628

630

632

620

RIG BAKING

CROSS-REFERENCES TO RELATED APPLICATIONS

This application is a continuation of U.S. patent application Ser. No. 10/844,048, filed May 11, 2004. This application claims priority to and incorporates by reference for all purposes U.S. Provisional Patent Applications "Rig Baking," Ser. No. 60/470,590, and "Defrobulation," Ser. No 60/470,767, both filed May 14,2003. This application further incorporates by reference for all purposes U.S. Patent Application "Defrobulated Angles for Character Joint Representation," U.S. patent application Ser. No. 10/844,049, filed May 11, 2004.

BACKGROUND OF THE INVENTION

The present invention relates to the field of computer graphics, and in particular to methods and apparatus for animating computer generated characters. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Computer-generated animation of characters is accomplished by manipulating a three-dimensional model of a character into a series of bodily positions, or poses, over a sequence of frames. A realistic looking character model is often extremely complex, having millions of surface elements and hundreds or thousands of attributes. Due to the complexity involved with animating such complex models, animation tools often rely on armatures and animation variables to define character animation.

An armature is a "stick figure" representing the character's pose, or bodily position. By moving the armature segments, which are the "sticks" of the "stick figure," the armature can be manipulated into a desired pose. As the armature is posed by the animator, the animation tools modify character model so that the bodily attitude of the character roughly mirrors that of the armature.

Animation variables are another way of defining the character animation of a complex character model. Animation variables are parameters for functions that modify the appearance of a character model. Animation variables and their associated functions are used to abstract complicated modifications to a character model to a relatively simple control. Animation variables and their associated functions may manipulate armature segments, thereby altering the appearance of the character model indirectly, or manipulate the character model directly, bypassing the armature.

For example, a single animation variable can define the degree of opening of a character's mouth. In this example, the value of the animation variable may manipulate several different parts of the armature and/or modify portions of the character model directly to create a modified character model having a mouth opened to the desired degree.

The functions associated with animation variables, referred to as model components, can be used to create a variety of realistic and artistic effects. For example, model components can be used to create layers of bones, muscle, and fat beneath the surface of a character model, so that the surface or skin of a character model deforms realistically as it is posed. Model components can also be used to simulate the movement of non-rigid features such as hair and cloth. In addition to replicating specific physical phenomena, model components can be used to manipulate the character model according to an algorithm or procedure, such as sculpted shapes, metaballs, and physics simulations.

Model components can be extremely complex and therefore time-consuming to execute. To create artistically effective character animation, an animator often creates a rough version of a scene and then repeatedly fine-tunes the character animation to create desired drama and expression of the final scene. The time needed to execute model components as animators pose and repose character models hinders the efficiency of the animator. In the worst case, an animator may be forced to use simplified "stand-in" character models to create the initial animation, and then wait to see the resulting animation with the final character model. In this situation, the animator is essentially working blind and can only guess at the final result. Conversely, the additional computing resources needed to process model components in a reasonable time, if even possible, substantially increases the costs of creating animation.

It is therefore desirable for a system and method of optimizing the performance of model components such that they can be executed in a reasonable time without consuming undue computing resources. It is further desirable to be able to optimize any type of model component, regardless of its function or complexity.

BRIEF SUMMARY OF THE INVENTION

Model components can be used to pose character models to create a variety of realistic and artistic effects. An embodiment of the invention analyzes the behavior of a model component to determine a statistical representation of the model component that closely approximates the output of the model component. As the statistical representation of model components execute faster than the original model components, the model components used to pose a character model can be replaced at animation time by equivalent statistical representations of model components to improve animation performance. The statistical representation of the model component is derived from an analysis of the character model manipulated through a set of representative training poses. The statistical representation of the model component is comprised of a weighted combination of posed frame positions added to a set of posing errors controlled by nonlinear combinations of the animation variables.

In an embodiment of the invention, a method of manipulating at least a portion of a character model into a pose using a model component comprises creating a statistical representation, referred to as a baked component, from the model component. The method identifies a portion of the character model associated with the baked component and determines a set of geometrically posed positions of a set of points of the character model from the pose. The method also predicts a set of posing errors associated with the set of points of the character model from the baked component and the pose. Each of the set of posing errors specifies a displacement of a point from a geometrically posed position. The manipulated character model is then formed by applying the set of posing errors to the set of geometrically posed positions of the set of points.

In an additional embodiment, the portion of the character model associated with the pose is identified by at least one reference frame influencing the portion of the character model. Furthermore, an embodiment defines the pose at least in part by a set of animation variables. In yet a further embodiment, animation variables, such as joint rotation angles, are expressed in a defrobulated form. Additionally, the set of posing errors may specify a single displacement of a point or a series of displacements of a point from a geometrically posed position over time.

In another embodiment, the baked component is created from the model component by identifying at least a portion of the character model associated with the model component. This embodiment then manipulates the character model through each of a set of training poses. The set of training poses are defined by a set of inputs and are representative of a range of motion of the character model. From the set of training poses, the embodiment determines a set of training posing errors for at least one point of the character model and then analyzes the set of training posing errors to determine a relationship between the set of inputs and the set of training posing errors. In yet a further embodiment, analyzing the set of posing errors includes performing a regression analysis of the set of training posing errors against the set of inputs.

In a further embodiment of creating a baked component, the set of inputs includes a set of animation variables. A portion of the set of animation variables are joint rotation angles expressed in a defrobulated form. Additionally, each of the set of training posing errors is at least one difference in position of the point of a character model from a geometrically posed position to at least one position specified by the model component. Each of the set of posing errors may specify a single displacement of a point or a series of differences in position over time of the point of the character model from the geometrically posed position to a set of positions over time specified by the model component.

BRIEF DESCRIPTION OF THE DRAWINGS

The invention will be described with reference to the drawings, in which.

DETAILED DESCRIPTION OF THE INVENTION

Figure 1:
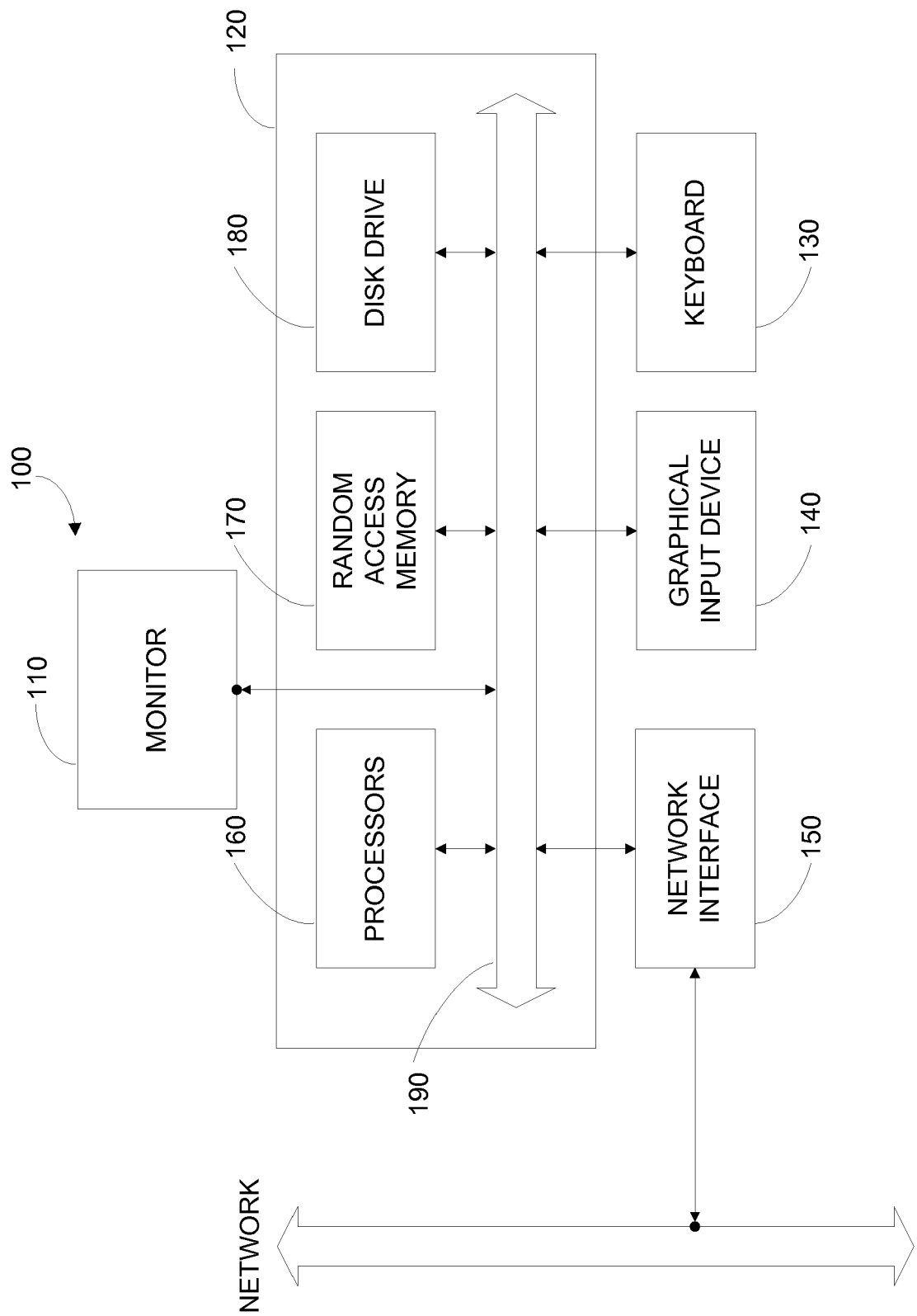
FIG. 1 illustrates a block diagram of a computer system suitable for implementing an embodiment of the invention.

FIG. 1 illustrates a block diagram of a computer system suitable for implementing an embodiment of the invention. FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2:
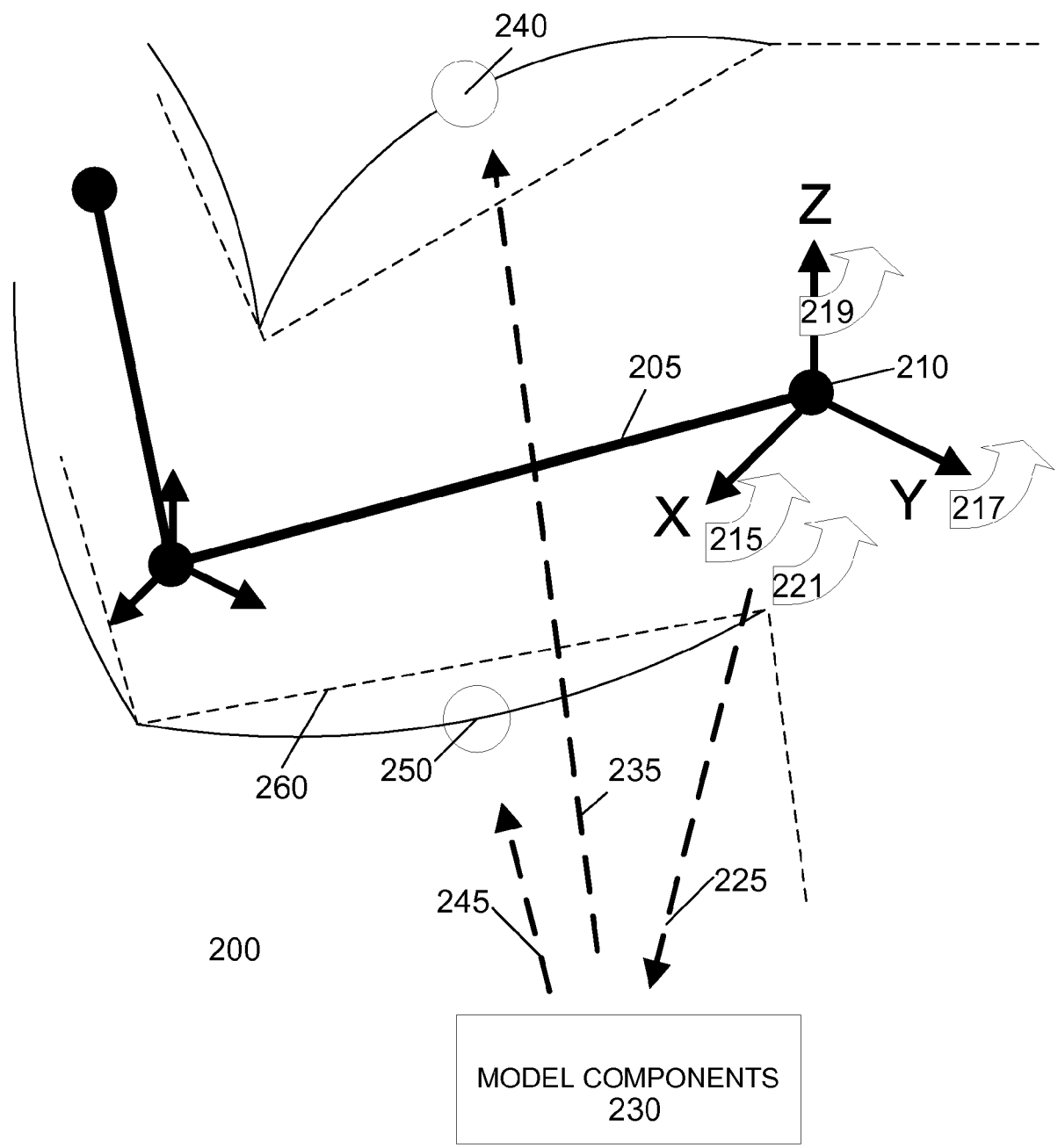
FIG. 2 illustrates a prior use of model components to determine the posed position of points on an articulated character model.

FIG. 2 illustrates a prior use of model components to determine the posed position of example points on an articulated character model 200. FIG. 2 illustrates a portion of the shoulder and arm region of character model 200. In an embodiment, character model 200 is a three-dimensional computer model of an object, although it is shown in two dimensions in the figures for clarity. Additionally, although character model 200 is shown to be humanoid in shape, character model 200 may take the form of any sort of object, including plants, animals, and inanimate objects with realistic and/or anthropomorphic attributes.

Character model 200 can be created in any manner used to create three-dimensional computer models, including manual construction within three-dimensional modeling software, procedural object creation, and three-dimensional scanning of physical objects. Character model 200 can be comprised of a set of polygons; voxels; higher-order curved surfaces, such as Bezier surfaces or non-uniform rational B-splines (NURBS); constructive solid geometry; and/or any other technique for representing three-dimensional objects. Additionally, character model 200 can include attributes defining the outward appearance of the object, including color, textures, material properties, transparency, reflectivity, illumination and shading attributes, displacement maps, and bump maps.

Character model 200 is animated through armature 205. Armature 205 includes one or more armature segments. In FIG. 2, the armature 205 are used to represent the pose of the upper arm of the character model 200. Animators manipulate the position and orientation of the segments of armature 205 to define a pose for the character model 200.

Armature segments can be constrained in size, position, or orientation, or can be freely manipulated by the animator. The number of armature segments can vary according to the complexity of the character, and a typical character can have an armature with hundreds or thousands of segments. In some cases, the number and position of armature segments is similar to that of a "skeleton" for a character; however, armature segments can also define subtle facial expressions and other character details not necessarily associated with bones or other anatomical features. Additionally, although the armature segments in the armature 205 of FIG. 2 are comprised of a set of line segments, in alternate embodiments of the invention the armature segments can be comprised of a set of surfaces and/or a set of volumes.

Character model 205 is animated by creating a sequence of frames, or still images, in which the character model 200 is progressively moved from one pose to another. Character model 200 can also be translated, rotated, scaled, or otherwise manipulated as a whole between frames. Animators can manually create the poses of a character model 200 for each frame in the sequence, or create poses for two or more key frames, which are then interpolated by animation software to create the poses for each frame. Poses can also be created automatically created using functions, procedures, or algorithms.

Whether all or a portion of a pose is created manually by an animator or automatically using a function, procedure, or algorithm, the pose of character model 200 can be defined by a set of animation variables. One type of animation variable specifies the rotation angles of an armature segment around an origin, referred to as a joint. In FIG. 2, the upper arm segment of armature 205 is rotated around joint 210. The rotation of the upper arm segment of the armature 205 around joint 210 is specified by animation variables 215, 217, 219, and 221. In this example, each of the animation variables 215, 217, 219, and 221 specifies a rotation about a coordinate axis.

The position of points of character model 200 are determined, at least in part, by model components 230. In an embodiment, animation variables 225, which may include animation variables 215, 217, 219, and 221 associated with joint 210, are input into the model components 230. Model components 230 then determines the position of one or more points of the character model 200 from the inputted animation variables. Model components 230 can employ any type of data processing function, procedure, or algorithm to determine the position of points of the character model 200, including but not limited to simulations of skin, bone, fat and muscle layers; dynamic cloth simulations; sculpted shapes; metaballs; and physics simulations. Model components can be used to determine the configuration of geometry or other attributes of character model 200 for points on the surface of the character model, points within the interior of character model 200, and/or points outside of character model 200.

In FIG. 2, model components 230 determine the position of points 240 and 250 of character model 200. The output 235 of model components 230 specifies the position of point 240. Similarly, the output 245 of model components 230 specifies the position of point 250. The positions of points 240 and 250 can be specified by model components 230 in terms of a displacement from the character model 200 in a base or rest position.

Alternatively, portions of the character model can be rotated in accordance with nearby armature segments to form a geometrically posed character model 260. A geometrically posed character model uses one or more geometric operations to transform from a rest or unposed orientation to a posed orientation. Geometric operations include translation, scaling, rotation, and other similar manipulations of portions of the character model, as well as the weighted or unweighted combination of these operations. Geometric operations can also include projecting points of a character model from the surface of the character model. The outputs 235 and 245 of model components 230 in turn specify a further displacement of points 240 and 250 from their positions on the geometrically posed character model 260. As discussed in detail below, regardless of how the model component specifies the position of points on the character model, a baked component in conjunction with a geometrically posed character model can be used to approximate the model component.

The complexity of many types of model components makes posing a character model time-consuming and computationally expensive. As discussed above, this hinders the ability of the animator to fine-tune character animation to produce the desired drama and expression. An embodiment of the invention optimizes the performance of model components by creating a statistical representation of each model component used to pose an character model. The statistical representation of the model component, referred to as a baked component, closely approximates the behavior of the model component with a greatly reduced execution time. Furthermore, a baked component can be used to approximate the behavior of any type of model component. Thus, the model components used to pose a character model can be replaced by equivalent baked components, thereby improving execution performance and reducing the computational resources needed in posing character models.

Figure 3:
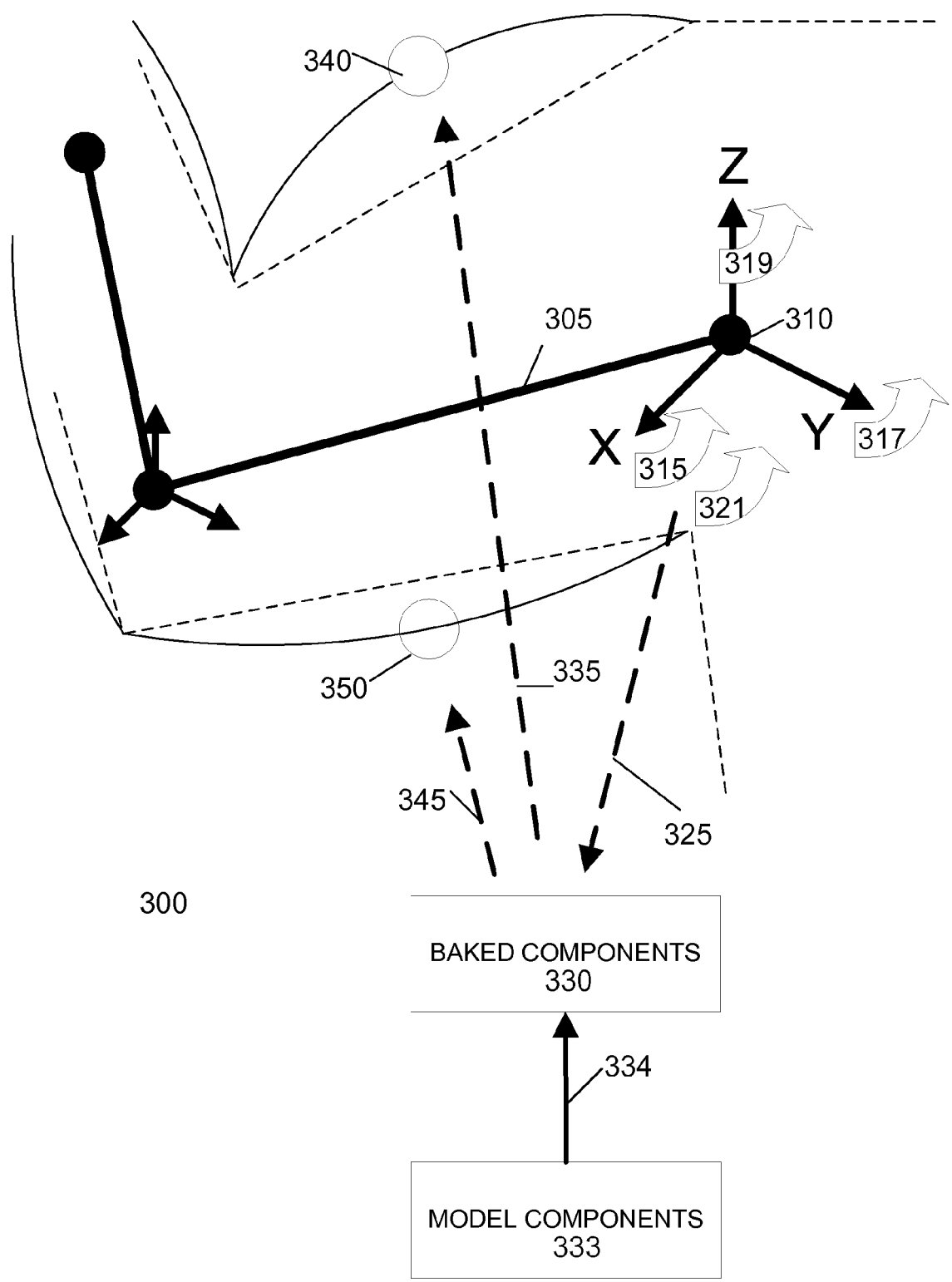
FIG. 3 illustrates the use of baked components to determine the posed position of a point on an articulated character model according to an embodiment of the invention.

FIG. 3 illustrates the use of baked components to determine the posed position of a point on an articulated character model according to an embodiment of the invention. Character model 300 is animated through armature 305, which in FIG. 3 represents the pose of the upper arm of the character model 300. Animators manipulate the position and orientation of the segments of armature 305 to define a pose for the character model 300.

The pose of character model 300 can be defined by a set of animation variables, including animation variables 315, 317, 319, and 321, which specify the rotation of an upper arm segment of the armature 305 around a joint 310. The position of points of character model 300 can be determined, at least in part, by model components 333. However, an embodiment of the invention decreases the execution time need to create a posed character model by replacing the model components 333 with a corresponding set of baked components 330 approximating the behavior of the model components 333. The baked components 330 are derived 334 from the model components 333. The baked components 330 can approximate any type of data processing function, procedure, or algorithm to determine the position of points of the character model 300, including but not limited to simulations of skin, bone, fat and muscle layers; dynamic cloth simulations; sculpted shapes; metaballs; and physics simulations.

In an embodiment, the baked components 330 can be derived the model components 333 in advance of the posing of the character model 300. Further, once derived from the model components 333, the baked components 330 can be used repeatedly to determine multiple poses of a character model 300.

In an embodiment, animation variables 325, which may include animation variables 315, 317, 319, and 321 associated with joint 310, are input into the baked components 330. Baked components 330 then determine the position of one or more points of the character model 200 from the inputted animation variables 325.

In FIG. 3, baked components 330 determine the position of points 340 and 350 of character model 300. The output 335 of model components 330 specifies the position of point 340. Similarly, the output 345 of model components 330 specifies the position of point 350. The positions of points 340 and 350 can be specified by model components 230 in terms of a displacement from the character model 300 in a base or rest position or alternatively as a displacement of points 340 and 350 from their positions on the geometrically posed character model 360.

Figure 4:
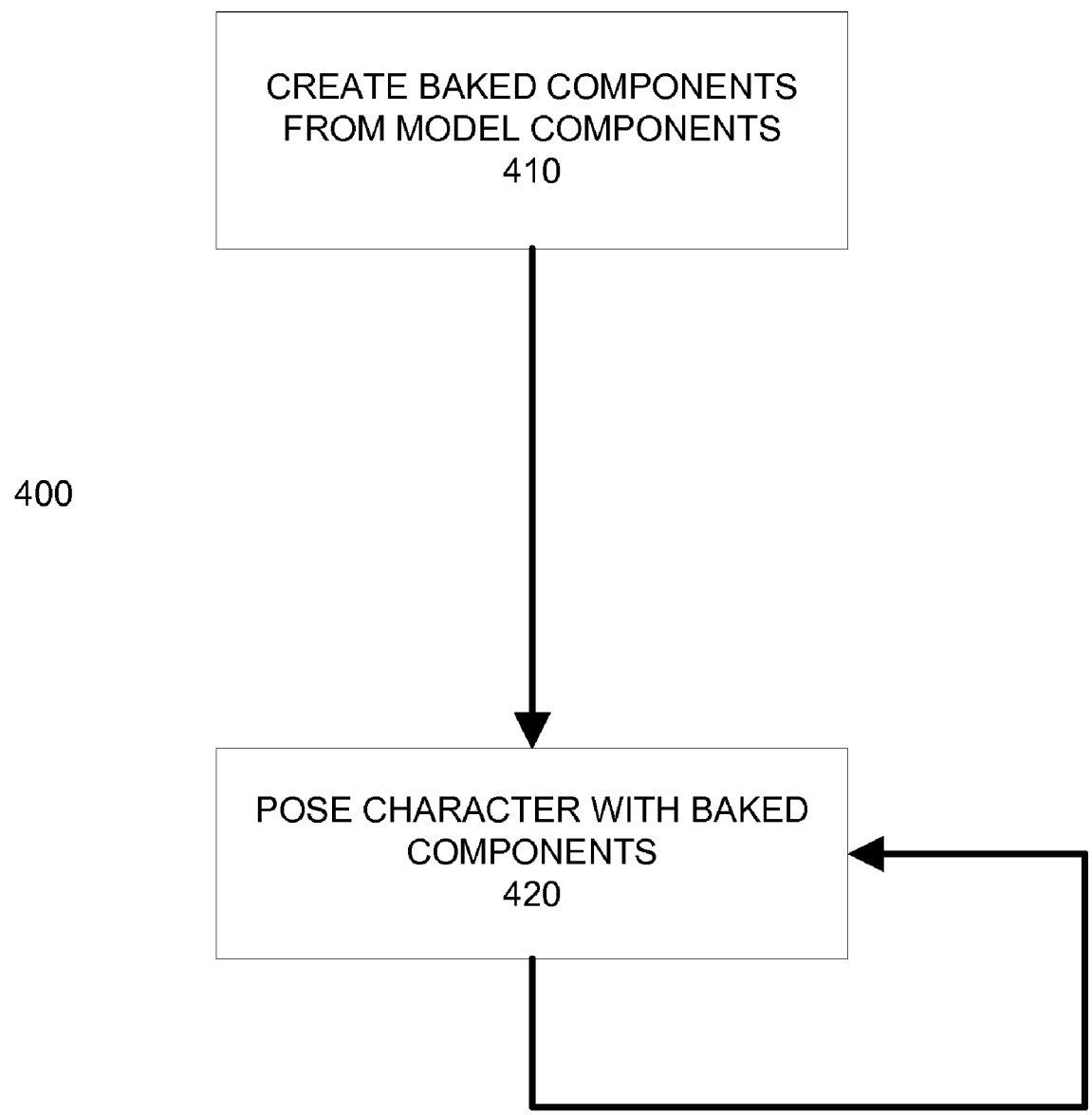
FIG. 4 illustrates two phases of a method for creating a posed character model according to the embodiment of the invention.

As discussed above, baked components can be derived from model components prior to posing the character model. Additionally, once the baked components have been computed, the character model can be repeatedly posed using the baked components. Thus, FIG. 4 illustrates two phases of a method 400 for creating a posed character model according to the embodiment of the invention. In the first phase 410, the baked components are derived from the model components in advance of posing the character model. Following the creation of the baked components, a posed character model can be created using the baked components in the second phase 420. An embodiment of the invention can repeat the second phase 420 to generate additional poses of the character model without re-creating the baked components.

Figure 5:
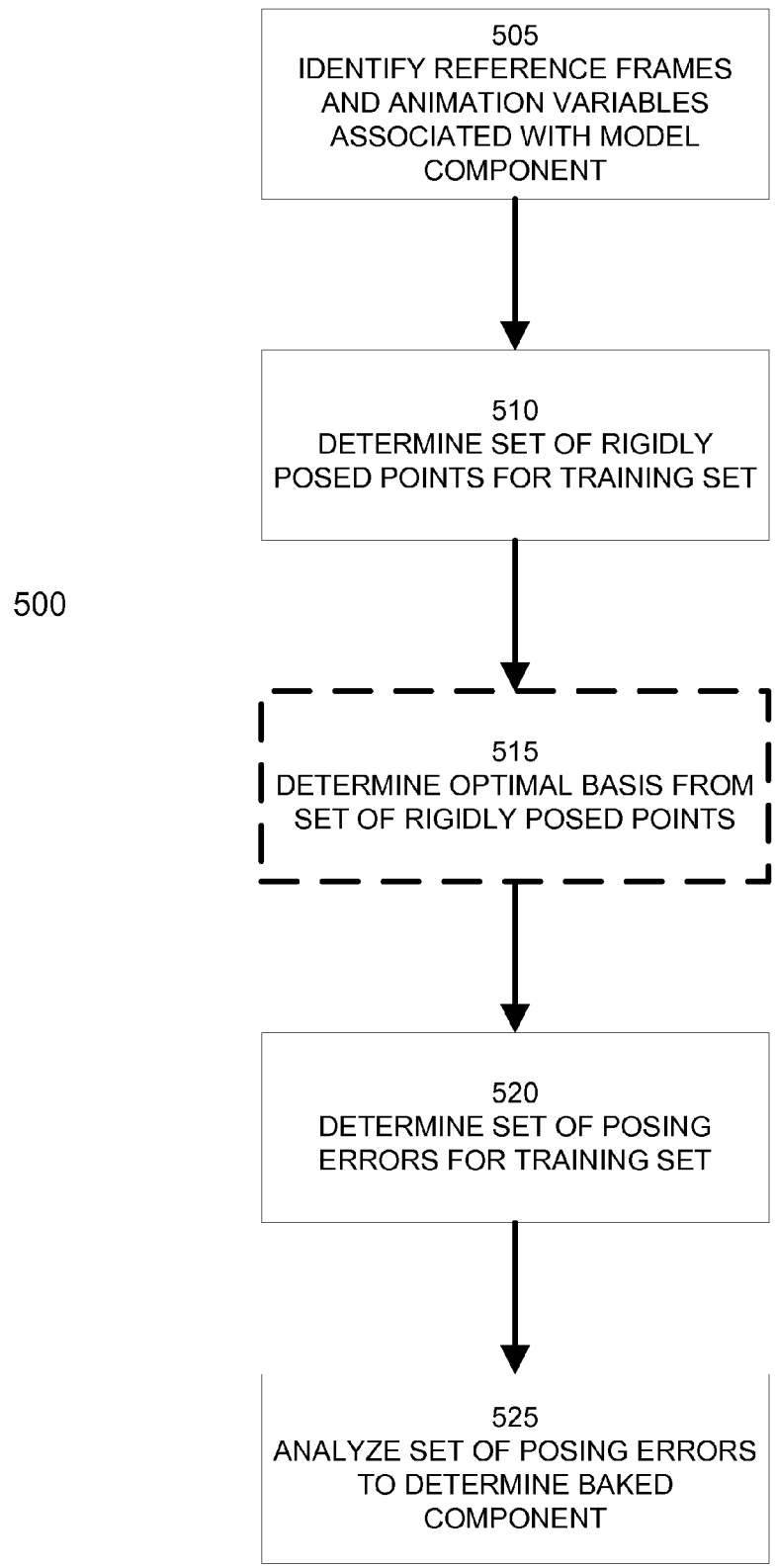
FIG. 5 illustrates a method for creating a baked component from a model component associated with an articulated character model according to an embodiment of the invention.

In an embodiment of the first phase 410, the baked components are created by analyzing the character model in set of training poses, referred to as a training set. FIG. 5 illustrates a method 500 for creating a baked component from a model component associated with an articulated character model according to an embodiment of the invention.

Step 505 identifies the set of animation variables and reference frames associated with the model component. The identified animation variables are the portion of the set of animation variables used to pose the character model that are inputted to the model component. The reference frames define regions of the character model affected by the outputs of the model component. In an embodiment, each reference frame defines a local coordinate system for one or more armature segments and the adjacent portions of the character model. For the set of reference frames associated with the model component, one frame is selected as a parent frame.

In an embodiment, a coordinate reference frame is composed of four vectors: a first vector defining the origin or location of the coordinate reference frame and three vectors defining the coordinate axes of the coordinate reference frame. Each of the points of the character model are associated with one or more reference frames via a set of reference frame weights. A set of reference frame weights defines a weighted average of the influence of the motion of one or more reference frames on a given point. In an embodiment, the associated reference frames and animation variables are determined manually. Alternatively, an analysis of the model component can determine the animation variables used as inputs and the set of points of the character model, and hence the reference frames, potentially affected by its outputs.

Figure 6A:
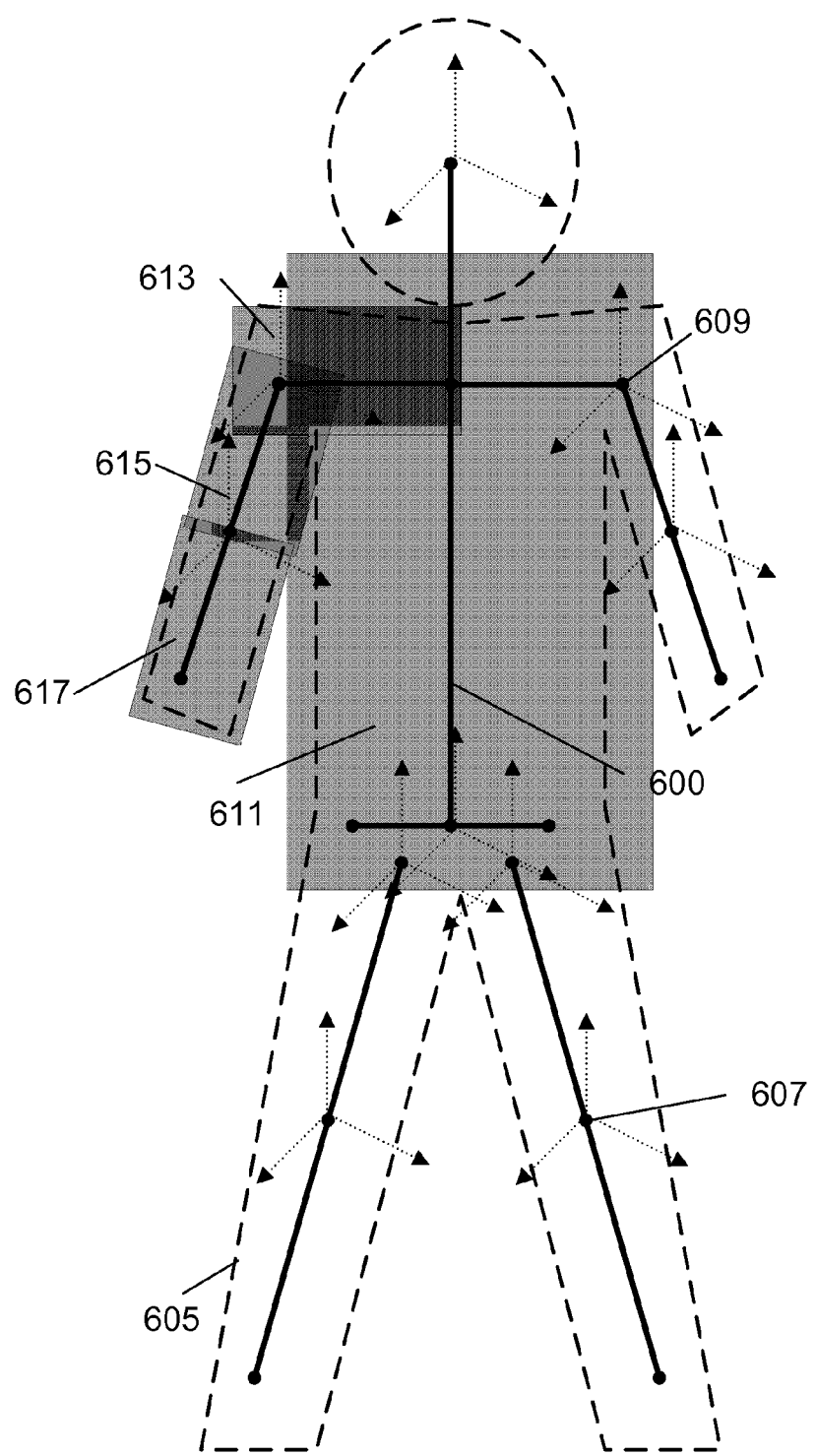
FIGS. 6A-6C illustrate an example application of a method for creating a baked component from a model component associated with an example articulated character model according to an embodiment of the invention.
Figure 6B:
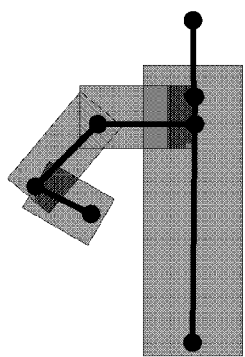
Figure 6B:
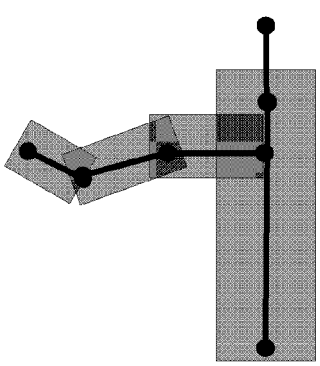
Figure 6B:
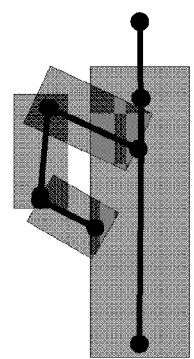
Figure 6B:
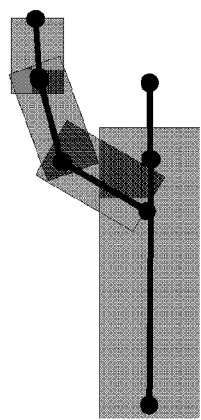
Figure 6B:
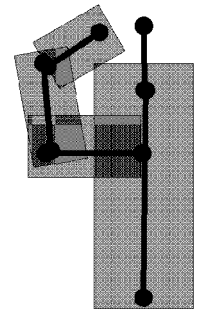
Figure 6B:
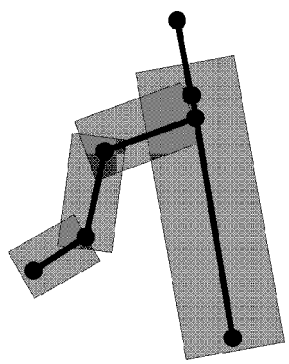
Figure 6C:
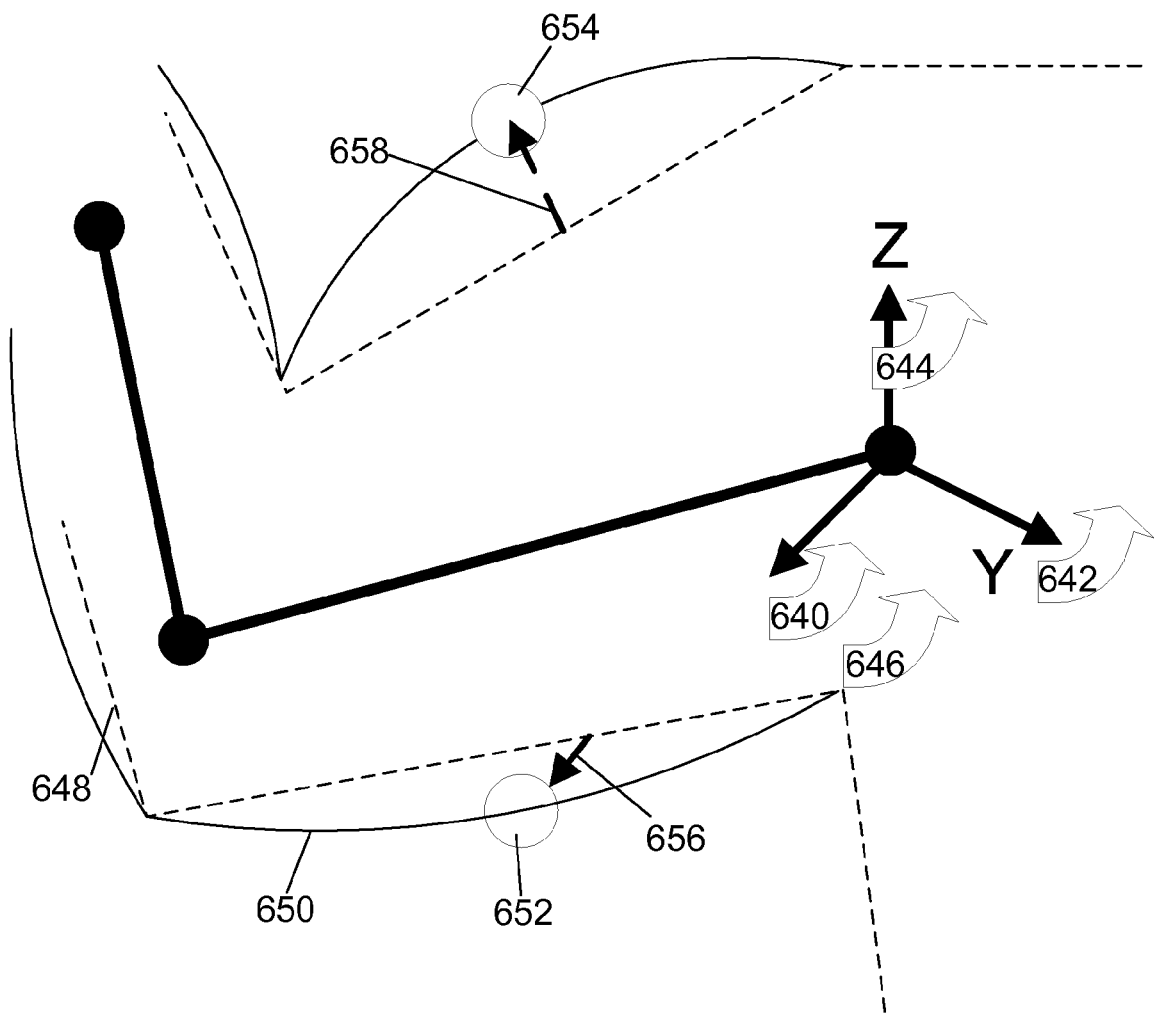

FIGS. 6A-6C illustrate an example application of a method for creating a baked component from a model component associated with an example articulated character model according to an embodiment of the invention. FIG. 6A illustrates an example character armature 600 used in posing a character model 605. Armature 600 includes a number of reference frames, such as reference frame 607 associated with the lower right leg of the armature 600 and reference frame 609 associated with the right shoulder of armature 600. Each reference frame is associated with one or more armature segments and the adjacent portions of the character model 605. For example, reference frame 611 is associated with the torso region of the character model 605, reference frame 613 is associated with the left shoulder area of the character model 605, and reference frames 615 and 617 are associated with the upper and lower left arm, respectively, of the character model 605.

In step 505, the reference frames and animation variables associated with a model component are identified. For example, a muscle deformation model component used to determine the deformation of the arm of character model 605 may be associated with the set of reference frames 611, 613, 615, and 617 and with the animation variables used to pose armature segments within these reference frames.

At step 510, the character model is posed according to a set of training poses. Each training pose is the result of the set of identified animation variables set to example values. The set of training poses ideally covers the normal range of motion for the portion of the character model associated with the model component. In an embodiment, the number of poses in the training set corresponds to at least the number of different reference frames associated with the model component, if not more. In an embodiment, a typical character model may have a training set including several thousands poses.

In an embodiment, the points of the character model are geometrically posed for each pose of the training set. The motion or posing of portions of the character armature also moves the associated reference frames. A geometric pose moves the points of the character model according to the posed position of the associated reference frames, without any displacement from the model component. Step 510 records the values of the animation variables and the corresponding positions of the points of the character model potentially affected by the model component for each training pose. In an embodiment, the posed positions of character model points is expressed in each of the set of reference frames. The set of animation variable values and corresponding positions of character model points comprises a set of sample data.

Continuing with the example of FIG. 6A, FIG. 6B illustrates an example set of training poses 620 for a set of reference frames and animation variables associated with the left arm of a character model as called for by step 510. The training set 620 includes training poses 622, 624, 626, 628, 630, and 632, each of which manipulates the portion of the character model associated with the model component into a different pose. In an example application of step 510, the values of the animation variables and geometrically posed points of the character model for each training pose are recorded to form a set of sample data.

Step 515 analyzes the set of sample data to determine an optimal set of frame basis functions. The portion of the set of set of sample data expressing the posed position of points is combined to form a matrix, and a single value decomposition of this matrix is calculated to find a set of frame basis functions for the set of sample data. In alternate embodiments, other methods of calculating a set of frame basis functions, such as a canonical correlation, can also be used. The set of frame basis functions can be used to express the position of model points optimally in the sample set in a least squares sense. Determining an optimal set of frame basis functions allows the set of sample data to be expressed more compactly, thereby minimizing the amount of data to be analyzed in subsequent steps of method 500. In an embodiment, step 515 decomposes the set of sample data using the set of frame basis functions to determine an optimized set of sample data. However, step 515 is optional and an alternate embodiment of method 500 bypasses step 515 and performs subsequent steps on the original set of sample data.

Step 520 determines a set of posing errors from the optimized set of sample data. In an embodiment, posing errors for a given pose are determined by comparing the geometrically posed positions of the points of the character model with their corresponding positions output from the model component for the same set of animation variables. The posing error for a character model point in a given pose is the difference between the position of the point output by the model component and the geometrically posed position. In a further embodiment, the position of points output from the model component changes over time. In this embodiment, the posing error for a point in a given training pose is a series of differences between the model component output over time and the point's geometrically posed position. For each training pose in the training set, the posing error is determined for each point of the character model potentially affected by the model component.

In another embodiment, the geometrically posed character model defines the position of the "skin" of the character model. The model component defines a position of points relative to this skin. For example, a cloth simulation model component may define the position of points on a character model's clothing relative to the skin of the character model. In this embodiment, the geometrically posed character model defines the direction or orientation of the posing error, and the output of the model component defines a posing error along this orientation.

In an embodiment, the set of frame weights is used to represent the posing error for each point. The posing error for each point is transformed to the parent reference frame selected in step 505. From the parent reference frame, the posing error for each point is weighted according to the set of reference frame weights associated with the point and transformed from the parent reference frame to each reference frame according to the frame basis functions determined in step 515. By transforming and distributing the posing error from the parent reference frame to the other reference frames, the posing error associated with each point of the character model will move with its associated reference frames.

Continuing with the example of FIGS. 6A and 6B, FIG. 6C illustrates the determination of the posing error for an example training pose. Animation variables defining the training pose, including animation variables 640, 642, 644, and 646, are input into the model component to determine the posed character model 650. The position of points of the character model, including points 652 and 654, are compared with their corresponding positions on the geometrically posed character model 648. The posing errors 656 and 658 are the differences in positions between points 652 and 654, respectively, on the posed character model 650 and the geometrically posed character model 648.

Step 525 analyzes the complete set of posing errors to determine the baked component closely approximating the behavior of the model component. In an embodiment, a statistical regression analysis is used to determine the posing error for the points of character model as a function of the animation variables. In one implementation, a nonlinear quadratic regression analysis is performed on the set of posing errors. In this implementation, the animation variables are split into positive and negative values, referred to as split animation variables, and considered as separate regression steps. In a further implementation, if a positive split animation variable falls below zero, the value is clamped to zero. Similarly, a negative split animation is clamped to zero if it goes above zero. In a further embodiment, the split animation variables, the square root of the split animation variables, and the square root of the product of adjacent split animation variables, which are animation variables associated with the same joint, are all used in the regression analysis to determine a function approximating the output of the model component.

In a further embodiment, animation variables representing joint rotations are converted to a defrobulated form to prevent the appearance of visual discontinuities. Unlike typical angle representations, the defrobulated angles do not have any angular discontinuities within the normal range of joint motion. In some applications, defrobulated angles typically exhibit a higher degree of statistical correlation with the output of model components, for example due to defrobulated angles lacking gimbal lock and being continuous over the normal range of joint motion. The conversion of joint angles from a four angle extended Euler form to a corresponding defrobulated format is described in detail in the related provisional and utility applications, "Defrobulation" and "Defrobulated Angles for Character Joint Representation", attorney docket numbers 21751-000900US and 21751-000910US.

In summary of the defrobulated angle format, a joint rotation represented as a standard four angle rotation (tw, a, b, c), corresponding to the right-handed angle rotation form (x, y, z, x), is converted to a set of projections xp=cos(a) cos(b); yp=cos(c) sin(a)+sin(c)sin(b)cos(a); and zp=sin(c) sin(a)–cos(c)sin(b)cos(a). From the set of projections, xp, yp, and zp, a chord angle ch is defined as ch=acos(xp). The chord angle ch is used as an intermediate value to determine a set of defrobulated angles (q, r, et). In an embodiment, q=ch*yp and r=ch*zp. The essential twist, et, is defined as:

$$et = tw + \arctan\left(\frac{zp}{yp}\right) + \arctan\left(\frac{\sin(b)}{\cos(b)\sin(a)}\right).$$

In its application to an embodiment of the present invention, animation variables representing joint rotations and not already in defrobulated form are converted into a defrobulated form as described above. The regression analysis is then performed using the defrobulated form of animation variables. In a further embodiment, the defrobulated animation variables are split into positive and negative values and considered as separate regression steps. In addition, defrobulated animation variables, their square roots, and the square roots of the products of adjacent animation variables can be included in the regression analysis.

The baked component determined in method 500 can be used in place of the model component in posing the character model for any desired pose, regardless of whether the desired pose was included in the training set. Furthermore, the output of several baked components can be combined to determine the pose of all or one or more portions of a character model.

Figure 7:
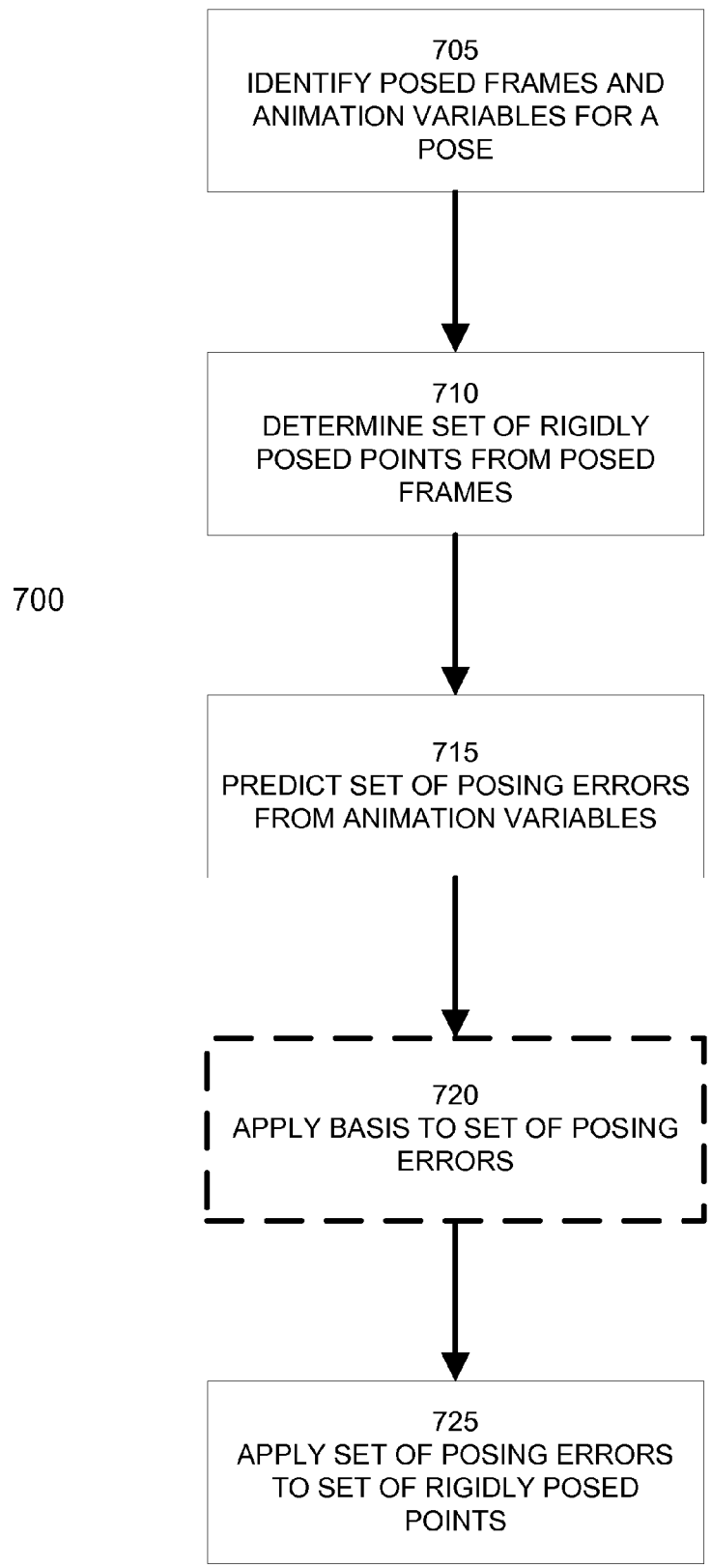
FIG. 7 illustrates a method for determining the posed position of a point on an articulated character model from a baked component according to an embodiment of the invention.

FIG. 7 illustrates a method 700 for determining the posed position of points on an articulated character model from a baked component according to an embodiment of the invention. For a desired character model pose, which in an embodiment can be defined by a set of animation variables, step 705 determines portion of the set of animation variables associated with the baked component. In an embodiment, the portion of the set of animation variables, referred to as the associated animation variables, are those animation variable having a statistical correlation with the output of baked component. Additionally, step 705 determines the reference frames associated with the baked component.

Figure 8A:
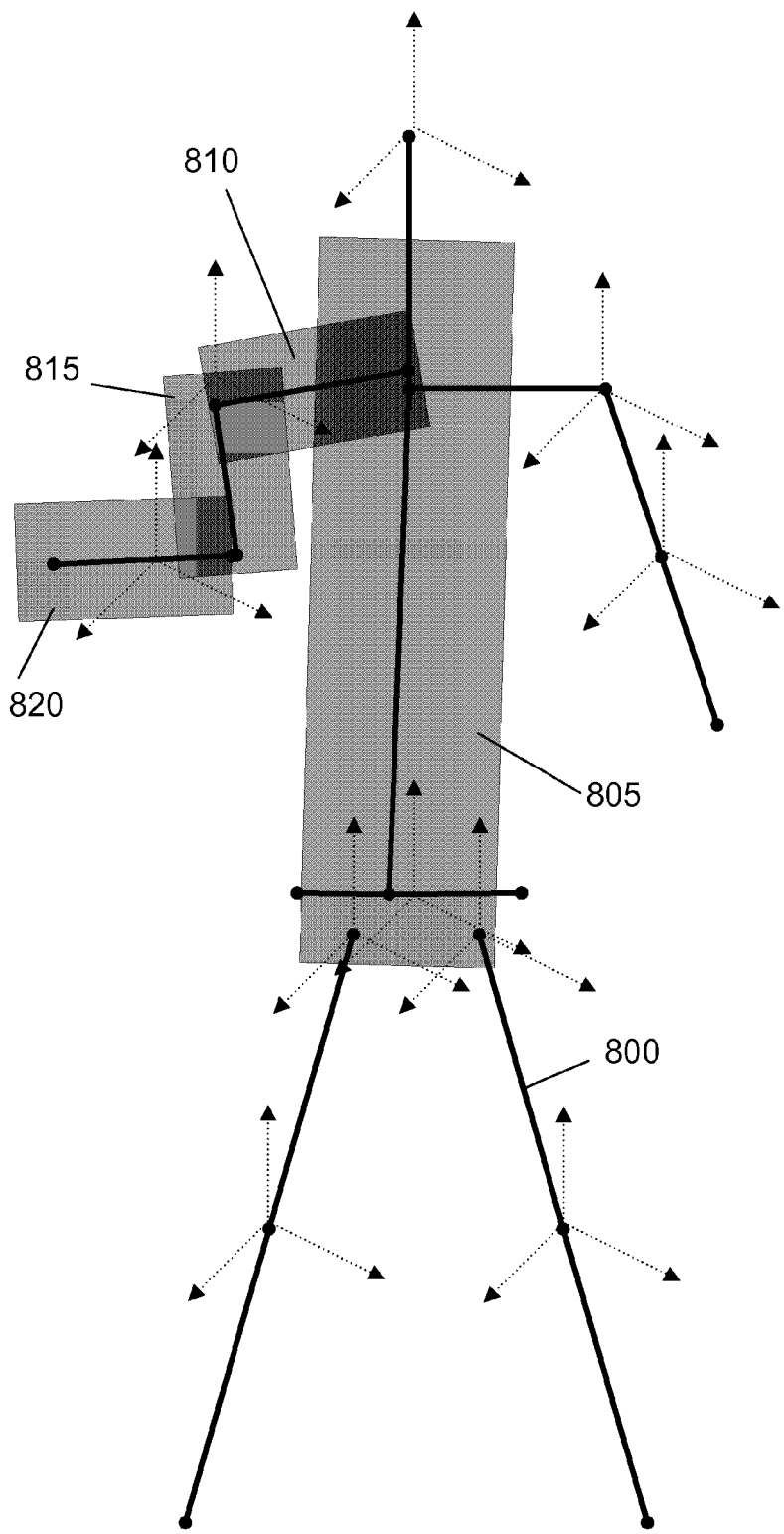
FIGS. 8A-8C illustrate an example application of a method for determining the posed position of a point on an articulated character model from a baked component according to an embodiment of the invention.
Figure 8B:
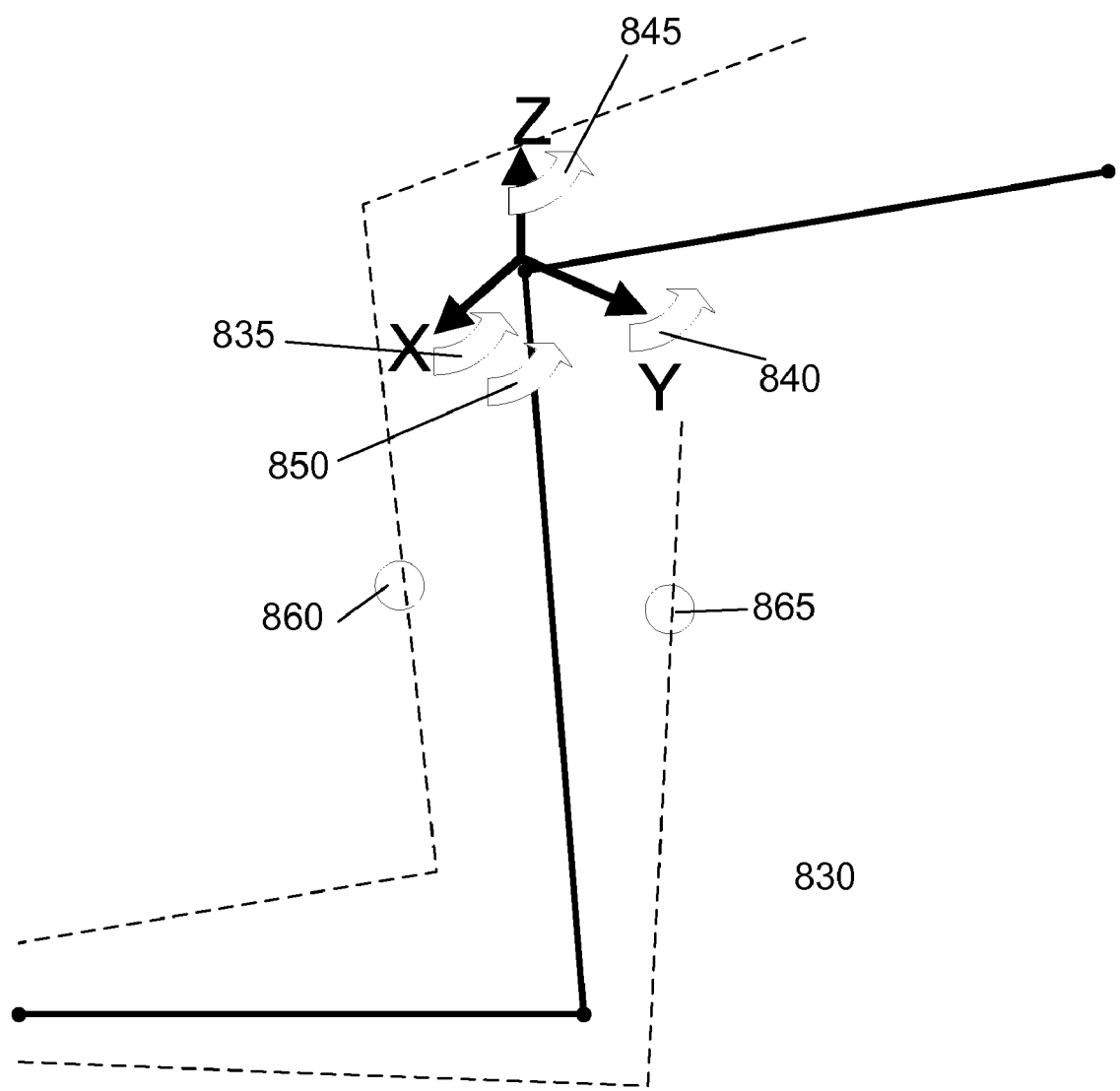
Figure 8C:
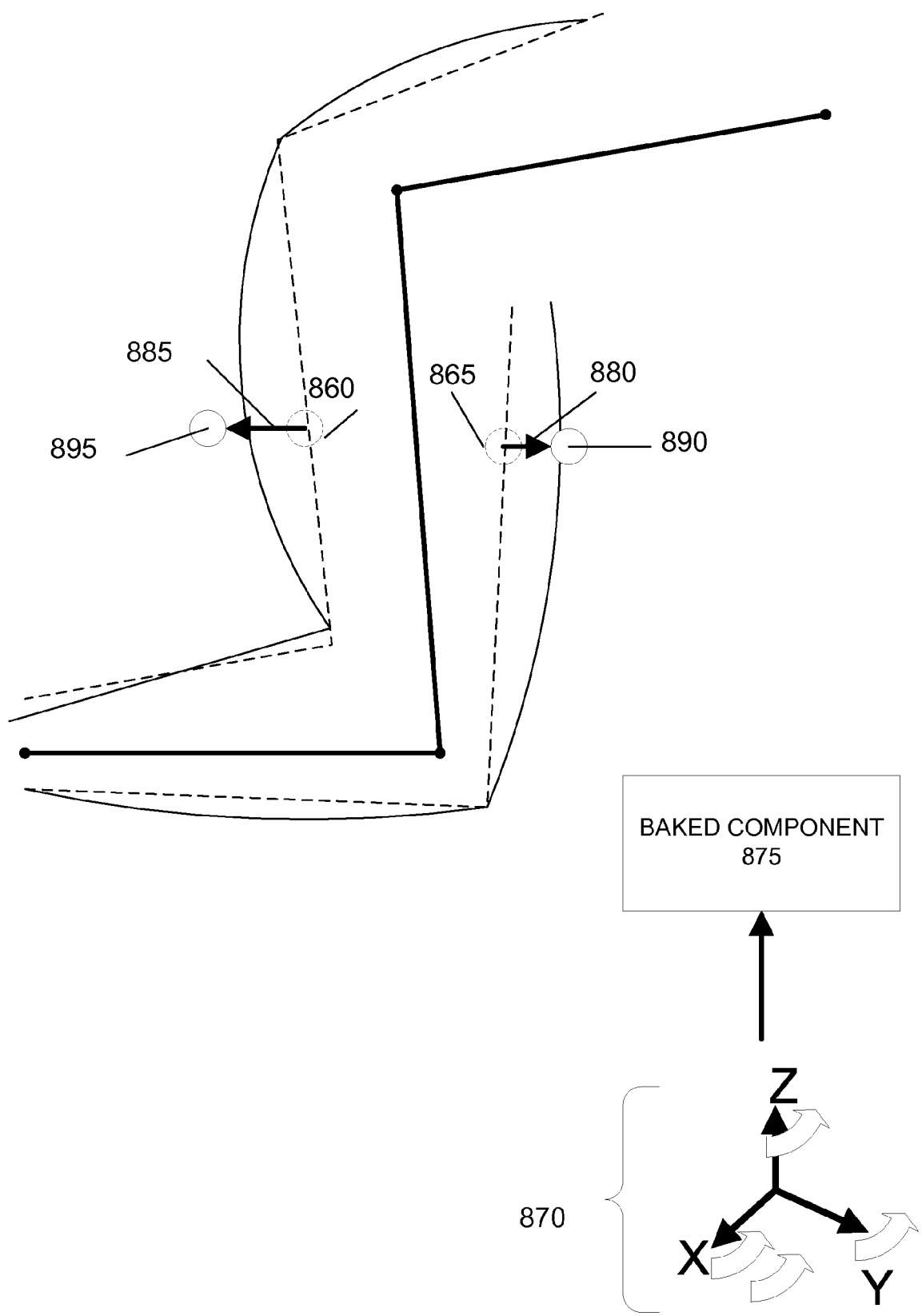

FIGS. 8A-8C illustrate an example application of a method for determining the posed position of a point on an articulated character model from a baked component according to an embodiment of the invention. In the example of FIGS. 8A-8C, the baked component represents the operation of a muscle deformer used to determine the deformation of the left arm of character model for a desired pose. FIG. 8A illustrates the selection of a set of reference frames associated with an example baked component for a desired pose as called for by an embodiment of step 705. Character armature 800 has been manipulated into a desired pose according to a set of animation variables. Step 705 identifies a portion of the set of animation variables associated with the baked component. Additionally, the reference frames, such as reference frames 805, 810, 815, and 820, affected by the baked component are also selected.

At step 710, the character model, or alternately the portions of the character model potentially affected by the baked component, is geometrically posed according to the associated animation variables. Character models can be geometrically posed in any manner known in the art.

FIG. 8B illustrates the determination of the geometrically posed positions of points of the character model as called for by an embodiment of step 710. In FIG. 8B, step 710 poses the portion of the character model 830 affected by the baked component according to the portion of the set of animation variables, including animation variables 835, 840, 845, and 850. The result of the application of the portion of the set of animation variables is a geometrically posed character model 855. Geometrically posed character model includes points 860 and 865.

Additionally, step 715 inputs the associated animation variables into the baked component. For animation variables corresponding with joint angles, an embodiment converts the animation variables to a defrobulated form to be input into the baked component. The output of the baked component is a posing error for at least one point on the character model for the desired pose. In an embodiment, the baked component outputs a series of posing error values representing the posing error over a period of time for at least one point on the character model.

If a set of optimal set of frame basis functions was used to reduce the size of the set of sample data in creating the baked component, then step 720 applies the set of frame basis functions to the posing error associated with each point of the character model. As a result, the posing error is decomposed into its component values in the associated reference frames.

Step 725 adds the posing error for each point to the position of the point on the geometrically posed character model and combines results into a posed character model. The posed character model resulting from the use of the baked component closely approximates the result produced from the original model component for the same set of animation variables.

FIG. 8C illustrates the application of posing errors output by the baked component to the geometrically posed positions of points of the character model as called for by an embodiment of steps 715-725. The portion of the set of animation variables 870 is input into the baked component 875 to produce a set of posing errors, including posing errors 880 and 885. The set of posing errors used to displace points of the geometrically posed character model, including points 860 and 865, to new positions, such as 895 and 890, respectively. The new positions of the points of the character model closely approximate the positions resulting from the application of the original model component.

It should be noted that once the posed or deformed model has been created using one or more of the above discussed embodiments, any rendering technique, for example ray-tracing or scanline rendering, can create a final image or frame from the model in combination with lighting, shading, texture mapping, and any other image processing information.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of creating a baked component approximating the behavior of a model component used to determine a pose of a character model, the method comprising:
    identifying at least a portion of the character model associated with the model component;
    manipulating the character model through each of a set of training poses, wherein the set of training poses are representative of a range of motion of the character model and defined by a set of inputs;
    determining a set of posing corrections from the set of training poses for at least one point of the character model, wherein each of the set of posing corrections is at least one difference in position of the point of a character model from a geometrically posed position to at least one position specified by the model component; and
    analyzing the set of posing corrections using a processor to determine a baked component specifying a relationship between the set of inputs and the set of posing corrections, wherein analyzing includes performing a non-linear regression analysis of the set of posing corrections against the set of inputs.

2. The method of claim 1, wherein the set of inputs includes a set of animation variables, and wherein analyzing includes:
    splitting at least a portion of the set of animation variables into separate positive and negative valued animation variables;
    associating the set of posing corrections with the positive and negative valued animation variable; and
    performing a separate non-linear regression analysis of the set of posing corrections against each of the positive and negative valued animation variables.

3. The method of claim 1, wherein each of the set of posing corrections is a series of differences in position over time of the point of the character model from the geometrically posed position to a set of positions over time specified by the model component.

4. The method of claim 1, wherein the set of posing corrections is represented using a set of basis functions determined from the training set.

5. The method of claim 1, wherein the non-linear regression analysis is a quadratic regression analysis.

6. The method of claim 1, further comprising:
    providing the baked component to animation software adapted to pose the character model.

7. A method of creating a baked component approximating the behavior of a model component used to determine a pose of a character model, the method comprising:

identifying at least a portion of the character model associated with the model component;

manipulating the character model through each of a set of training poses, wherein the set of training poses are representative of a range of motion of the character model and defined by a set of inputs, wherein the set of inputs includes a set of animation variables;

determining a set of posing corrections from the set of training poses for at least one point of the character model, wherein each of the set of posing corrections is at least one difference in position of the point of a character model from a geometrically posed position to at least one position specified by the model component;

splitting at least a portion of the set of animation variables into separate positive and negative valued animation variables;

associating the set of posing corrections with the positive and negative valued animation variables; and performing a separate regression analysis of the set of posing corrections against each of the positive and negative valued animation variables using a processor to determine a baked component specifying a relationship between the set of inputs and the set of posing corrections.

8. The method of claim 7, wherein each of the set of posing corrections is a series of differences in position over time of the point of the character model from the geometrically posed position to a set of positions over time specified by the model component.

9. The method of claim 7, wherein the set of posing corrections is represented using a set of basis functions determined from the training set.

10. The method of claim 7, further comprising:

providing the baked component to animation software adapted to pose the character model.

11. A method of manipulating at least a portion of a character model into a pose using a model component, the method comprising:

identifying at least a portion of the character model associated with the model component;

manipulating the character model through each of a set of training poses, wherein the set of training poses are representative of a range of motion of the character model and defined by a set of inputs;

determining a set of posing corrections from the set of training poses for at least one point of the character model;

analyzing the set of posing corrections using a processor to create a baked component specifying a relationship between the set of inputs and the set of posing corrections, wherein analyzing includes performing a non-linear regression analysis of the set of posing corrections against the set of inputs;

determining a set of geometrically posed positions of a set of points of the character model from the pose;

predicting a set of posing errors associated with the set of points of the character model from the baked component and the pose, wherein each of the set of posing errors specifies a displacement of a point from a geometrically posed position; and applying the set of posing errors to the set of geometrically posed positions of the set of points.

12. The method of claim 11, wherein the portion of the character model associated with the pose is identified by at least one reference frame influencing the portion of the character model.

13. The method of claim 11, wherein the pose is defined at least in part by a set of animation variables.

14. The method of claim 13, wherein analyzing includes:

splitting at least a portion of the set of animation variables into separate positive and negative valued animation variables;

associating the set of posing corrections with the positive and negative valued animation variable; and performing a separate non-linear regression analysis of the set of posing corrections against each of the positive and negative valued animation variables.

15. The method of claim 11, wherein at least one of the set of posing errors specifies a series of displacements of a point from a geometrically posed position over time.

16. The method of claim 11, wherein each of the set of posing corrections is at least one difference in position of the point of a character model from a geometrically posed position to at least one position specified by the model component.

17. The method of claim 11, wherein each of the set of posing corrections is a series of differences in position over time of the point of the character model from the geometrically posed position to a set of positions over time specified by the model component.

18. The method of claim 11, wherein the set of posing corrections is represented using a set of basis functions determined from the training set.

19. The method of claim 11, wherein the non-linear regression analysis is a quadratic regression analysis.

20. A method of manipulating at least a portion of a character model into a pose using a model component, the method comprising:

identifying at least a portion of the character model associated with the model component;

manipulating the character model through each of a set of training poses, wherein the set of training poses are representative of a range of motion of the character model and defined by a set of inputs, wherein the set of inputs includes a set of animation variables;

determining a set of posing corrections from the set of training poses for at least one point of the character model, wherein each of the set of posing corrections is at least one difference in position of the point of a character model from a geometrically posed position to at least one position specified by the model component;

splitting at least a portion of the set of animation variables into separate positive and negative valued animation variables;

associating the set of posing corrections with the positive and negative valued animation variables;

performing a separate regression analysis of the set of posing corrections against each of the positive and negative valued animation variables using a processor to create a baked component specifying a relationship between the set of inputs and the set of posing corrections;

determining a set of geometrically posed positions of a set of points of the character model from the pose;

predicting a set of posing errors associated with the set of points of the character model from the baked component and the pose, wherein each of the set of posing errors specifies a displacement of a point from a geometrically posed position; and applying the set of posing errors to the set of geometrically posed positions of the set of points.

21. The method of claim 20, wherein the portion of the character model associated with the pose is identified by at least one reference frame influencing the portion of the character model.

22. The method of claim 20, wherein at least one of the set of posing errors specifies a series of displacements of a point from a geometrically posed position over time.

23. The method of claim 20, wherein each of the set of posing corrections is at least one difference in position of the point of a character model from a geometrically posed position to at least one position specified by the model component.

24. The method of claim 20, wherein each of the set of posing corrections is a series of differences in position over time of the point of the character model from the geometrically posed position to a set of positions over time specified by the model component.

25. The method of claim 20, wherein the set of posing corrections is represented using a set of basis functions determined from the training set.

* * * * *